July 11, 1967  F. C. SCHNABEL  3,330,610

CAKE CONTAINER AND SERVER

Filed April 11, 1966

INVENTOR.
*Fred C. Schnabel*

United States Patent Office 3,330,610
Patented July 11, 1967

3,330,610
CAKE CONTAINER AND SERVER
Fred C. Schnabel, 4820 W. 38th St.,
Minneapolis, Minn. 55416
Filed Apr. 11, 1966, Ser. No. 541,779
5 Claims. (Cl. 312—284)

This invention relates to food containers, and more particularly a cake container and server.

It is therefore the main purpose of this invention to provide a cake container and server wherein a cake or pie is held on an inner rotatable plate which is provided with a plurality of molded pins to scale the cake or pie for cutting.

Another object of this invention is to provide a cake container and server wherein the lower edge of the cover is provided with a bead registering with and adapted to be rotatably seated within a semi-circular flange of the base portion, thereby providing new and novel means to secure the cover to the container base.

Another object of this invention is to provide a cake container and server in which a cake, pie, or other pastries may be kept fresh and soft and from which the cake or pie may be served.

Still another object of this invention is to provide a cake container and server which is of rugged construction, inexpensive to manufacture and provides maximum utility to its user.

Other objects and advantages of this invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

Figure 2:
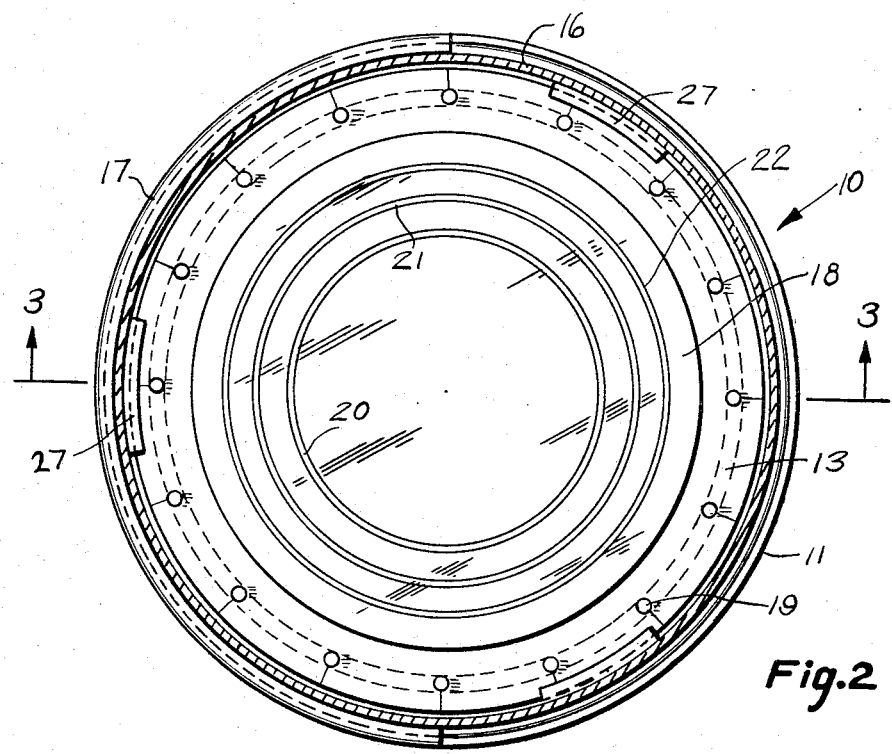
FIGURE 2 is a transverse sectional view taken on lines 2—2 of FIGURE 1, but drawn to a larger scale.
Figure 3:
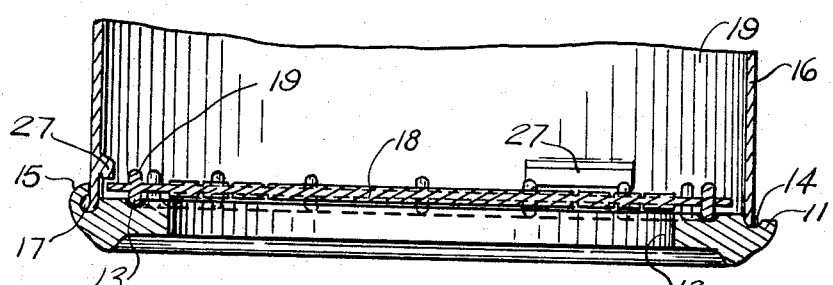
FIGURE 3 is a vertical sectional view taken on lines 3—3 of FIGURE 2.
Figure 4:
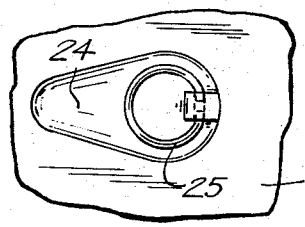
FIGURE 4 is a fragmentary detail illustrating the handle pivotally secured to the top of the cover.
Figure 1:
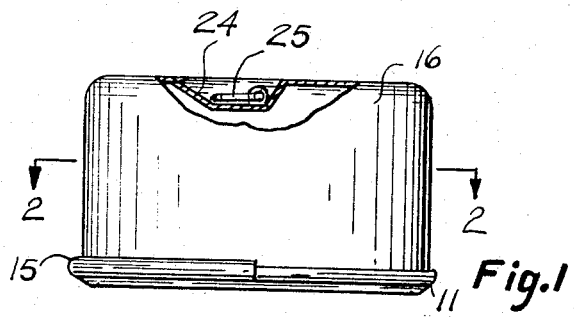
FIGURE 1 is an assembly in elevation of this invention.

According to this invention, a cake container and server 10 is provided with a circular base 11 which includes a circular hole 12 centrally positioned therein. The top portion of base 11 includes a circular groove 14 which is adapted to admit the bottom portion of the cylindrically shaped cover 16. Approximately one half of groove 14 is provided with an inwardly bent flange 15 for the purpose of securing a beadlike 17 shaped portion of the cover 16. Since flange 15 of base 11 covers approximately one hundred eighty degrees or half of the peripheral segment of said base, bead-like portion 17 is adapted to be rotatably secured within said flange and is provided with substantially identical angular dimensions as said flange, that is, approximately one hundred eighty degrees or one half of the bottom portion of cover 16. Another groove 13 which is of smaller diameter than the previously mentioned groove 14 is centrally positioned within base 11. Groove 13 serves the purpose of rotatably securing pins 19 of the cake or pie plate 18 therein. Pins 19 are circularly disposed within the circular plate 18 in such a manner that they always abut the semi-circular surface of groove 13. In addition, circular plate 18 is provided with a plurality of centrally positioned circular grooves 20, 21 and 22. The lower portion of cover 16 is provided with a plurality of inwardly extending flanges 27 which also extend over the peripheries of the circular plate 18 thereby providing additional securing means for said plate when the cover 16 is in a closed position. Top portion of said cover is provided with a recess 24 which houses a circular ring or handle 25 suitably secured within said recess and adapted to provide grasping means when it is necessary to raise or lower said cover 16.

Looking now at the drawing, one will see that a cake, pie or some other pastry (not shown) is located and positioned on top of the circular plate 18. Pins 19, which upwardly and downwardly extend from plate 18, serve as grasping and scaling means for said pie, cake or pastry. If it is desired to remove cover 16 from base 11, cover 16 is rotated until its bead-like end 17 is fully positioned within the circular groove 14 of base 11. On the other hand, the straight downwardly extending end of cover 16 is positioned within said groove in such a manner that it abuts the semi-circular flange 15. Once cover is removed, cake, pie or pastry may be turned in either direction for cutting purposes. As it was mentioned before, pins 19 serve for the purpose of scaling or otherwise dividing said cake, pie or pastry into equal portions. If it is desired, indicator markings (not shown) may be attached to the periphery of the circular plate 18 for the purpose of exactly marking the location of each pin 19. In addition to the fact that pins 19 provide rotating and scaling means for said cake, pie or pastry, each of said pins may be utilized as a cooling agent to any of the above mentioned foodstuffs.

It will also be noted that in addition to the previously described embodiment, this invention provides for various changes without deviating from the scope and spirit thereof. For example, the top portion of the cover 16 may be provided with a handle (not shown) which is solidly molded within the recess 24 of said cover 16. A solid circular base may be shown without the circular hole 12 positioned therein. Also, for the purpose of securing said cover 16 to the base 11, a plurality of snap-type lips (not shown) may be mounted on said base. Also, a plurality of ball-bearings (not shown) in snap lips may be included within said base 11, thereby providing rotation means for the circular plate 18.

I claim:

1. A cake container and server comprising, in combination, a circular base having a hole therein, said base being provided with a first circular groove, an internally turned flange portion integrally secured to a section of said base and adapted to be positioned above a portion of said groove, a hollow cover assuming a cylindrical configuration, the bottom portion of said cover adapted to be positioned within said first groove, a segment of said bottom portion is designed to assume an outwardly disposed bead-like configuration and be rotatably positioned within the flanged portion of said groove thereby providing means for raising said cover when said bead-like bottom portion of said cover is fully rotated into the non-flanged section of said first groove, said base being provided with a second circular groove which is of smaller diameter than said first circular groove and is positioned within said first groove at equal distances therefrom, a circular plate, a plurality of equally spaced, concentrically positioned top and bottom pins secured to said plate, said bottom pins adapted to be admitted within said second circular groove of said base thus providing turning means for said plate, and said top pins adapted to provide securing and dividing means for the cake positioned on said circular plate.

2. The cake container and server according to claim 1, wherein the lower internal portion of said circular cover is provided with a plurality of inwardly extending projections, said projections are adapted to overlap the peripheral portion of said circular plate for securing said plate on said base when said cover is in a closed position.

3. The cake container and server according to claim 1, wherein the top portion of said cover includes a recess, a ring-like handle member secured within said recess and thereby providing means for removing said cover from said base after the bead-like bottom portion of said cover is rotated into the non-flanged portion of said first circular groove.

4. The cake container and server according to claim 1, wherein said circular plate is provided with a plurality of auxiliary circular recesses centrally positioned on said plate and equally spaced from each other for supporting the bottom portion of said cake and limiting the outward expansion thereof.

5. The cake container and server according to claim 1, wherein said bottom pins may be provided with indicator markers, said markers adapted to extend outwardly from said base for scaling said cake for cutting purposes.

References Cited

UNITED STATES PATENTS

| | | | |
|---|---|---|---|
| 183,283 | 10/1876 | Cate | 312—284 |
| 449,144 | 3/1891 | Tommins | 312—284 |
| 1,516,582 | 11/1924 | Spalding | 312—284 |
| 1,762,417 | 6/1930 | Pfefferkorn | 312—284 |
| 2,678,861 | 5/1954 | Funk | 312—284 |
| 2,758,458 | 8/1956 | Carlson | 312—284 X |
| 3,169,342 | 2/1965 | Krauss | 312—284 |

DAVID J. WILLIAMOWSKY, *Primary Examiner.*

JAMES T. McCALL, *Examiner.*